US005125037A

United States Patent [19]

Lehtonen et al.

[11] Patent Number: 5,125,037

[45] Date of Patent: Jun. 23, 1992

[54] PROCEDURE FOR MONITORING PRINTING QUALITY

[75] Inventors: Tapio J. Lehtonen; Hannu T. Rantala, both of Espoo; Raimo J. Launonen, Järventausta; Juha-Pekka Blom, Hansatie, all of Finland

[73] Assignee: Valtion Teknillinen Tutkimuskeskus, Espoo, Finland

[21] Appl. No.: 485,283

Related U.S. Application Data

[63] Continuation of PCT/F188/00140, Aug. 31, 1988, published as WO89/1867, Mar. 9, 1989.

[22] Filed: Feb. 26, 1990

[30] Foreign Application Priority Data

Aug. 31, 1987 [FI] Finland .............................. 87/3773

[51] Int. Cl.[5] .............................................. G06K 9/18

[52] U.S. Cl. ....................................... 382/8; 356/429; 101/248

[58] Field of Search .......................... 382/8; 73/865.8; 101/248, 139, 140; 356/429, 430, 431

[56] References Cited

U.S. PATENT DOCUMENTS

| | | | |
|---|---|---|---|
| 3,745,527 | 7/1973 | Yoshimura et al. | 356/407 X |
| 3,890,048 | 6/1975 | Abbundio et al. | 101/335 X |
| 4,667,596 | 5/1987 | Dutzel et al. | 101/211 |
| 4,827,626 | 5/1989 | Wieland | 33/614 |
| 4,924,505 | 5/1990 | Leberl et al. | 382/8 |
| 5,027,416 | 6/1991 | Loriot | 382/8 |

FOREIGN PATENT DOCUMENTS

| | | | |
|---|---|---|---|
| 177885 | 4/1980 | European Pat. Off. | |
| 96238 | 12/1983 | European Pat. Off. | |
| 127831 | 12/1984 | European Pat. Off. | |
| 3625449 | 2/1987 | Fed. Rep. of Germany | |
| 126536 | 7/1983 | Japan | 101/248 |
| 123665 | 7/1984 | Japan | 101/248 |
| 39275 | 3/1985 | Japan | 382/8 |
| 71655 | 4/1987 | Japan | 101/248 |
| 77937 | 4/1987 | Japan | 101/248 |
| 2065871 | 7/1981 | United Kingdom | 356/249 |

*Primary Examiner*—Tom Noland
*Attorney, Agent, or Firm*—Ostrager & Chong

[57] ABSTRACT

The invention concerns a procedure for controlling the quality of printing, wherein measuring marks (11, 12, 13 and 14) are placed on the printing base, such as a paper web, beside and/or among the actual printing are employed. A lighting unit (1) and an electronic camera (2) trained on the paper web (3) and the operation of the camera at least is synchronized with the transport speed in the printing process. With the camera (2) an image is recorded from a measuring area (9) on the paper web (3), which area contains measuring marks (11, 12, 13 and 14). The image is stored in an image memory (5). The image is taken from the image memory (5) to be processed, whereat the measuring marks are identified and located therein and on their basis the printing quality is checked.

5 Claims, 1 Drawing Sheet

PROCEDURE FOR MONITORING PRINTING QUALITY

This application is a continuation of PCT application PCT/FI 88/00140 now WO 89/01867.

FIELD OF THE INVENTION

The present invention concerns a procedure for monitoring the quality of printing, wherein said procedure is utilized measuring marks placed on the printing base beside and/or among the actual printing.

BACKGROUND OF THE INVENTION

The need exists in printing technology to measure the darkness of the product surface and the register relative to each other of the different colours, in order to obtain a product of commercially good quality. Web densitometers have long been used to measure the darkness of colours, and register measuring means have been used to measure the register of different colours.

The greatest shortcoming of existing register measuring methods is the large size of the register marks that are employed. The breadth of a single mark is already 6 mm, and the total space requirement of marks printed in different colours is up to 120 mm. Sufficient space cannot be found for such large marks in the folds of magazine print or equivalent advertising leaflets, nor in the margins which are trimmed off. In newspaper printing the use of a small, unobtrusive register mark is the sole possibility because from this product nothing is trimmed off at page make-up. All the same, the need of measuring as well as its required accuracy is high, as coloured illustrations are increasing in number.

Register measurement is usually based on one light source/detector pair or several light source/detector pairs disposed side by side in the direction of movement of the paper web or other printing base and monitoring each mark. Measuring of distance in the direction of travel is based on measuring the movement of the paper, and determination of lateral positioning is accomplished by examining the margin of the mark, which has been printed in a slanting position relative to the direction of travel. Furthermore, the pick-up consisting of one light source/detector pair is usually provided with a motorized or manual lateral displacement mechanism which is used at the beginning of measurement to find the marks and, during measurement, to keep the light source/detector pair at the proper point, because the paper web may become somewhat displaced.

Any lateral swings of the paper web, or variations of its tension, having an effect exceeding the size of the mark that is used will usually result in an interruption of measurement as the marks move out of the measuring range of the pick-up. For this reason marks which are as large as is feasible are nowadays used.

SUMMARY OF THE INVENTION

With the aid of the procedure of the invention distinct improvements are achieved in printing quality control implemented with the aid of measuring marks. In order to accomplish this, the procedure of the invention is characterized by that which is stated in the claims following farther below.

In the procedure of the invention, a lighting means and an electronic camera are trained on the printing base and the operation at least of the camera is synchronized with the transport velocity of the printing process; an image is taken with the camera of the measuring area containing measuring marks; the image is stored in an image memory; the image is retrieved from the image memory for processing in which the measuring marks therein are identified and located and on their basis the printing quality is checked. It is possible from the image stored in the image memory to identify the register and density measuring marks, to identify the colours and to determine the register and density of the colours.

It is advantageous if the measuring marks are located in the whole scanning area of the camera, whereafter processing of the image is confined to a given area and specifically to the sites of the marks. It is thus possible with the camera to reproduce for examination an area significantly wider than that covered by the marks. The marks can be printed to be very small indeed and unobtrusive, for instance immediately adjacent to a colour picture. Variations of paper tension and lateral oscillation will not interfere with finding the marks or with their staying in the area covered by the camera, and they will therefore have no effect on the result of measurement either. No complicated mechanisms for lateral pick-up displacement are required.

In the procedure of the invention, the register marks relating to different colours can be identified by their predetermined shape and/or position. It is thus understood that the register mark of each colour may be printed as a configuration of different shape or placed at a different angle with reference to the direction in which the printing base is transported. The marks can be identified within the image area by the aid of an appropriate contour identifying programme. The image processing, or measurement, may then be confined to a small area at the site of the marks, whereby the measurement is speeded up significantly. It is thus possible to measure the register in an advantageous and simple way with a monochrome camera.

In the procedure of the invention, the image recorded from a confined, small area at the mark may be displayed, and enlarged on a monitor. This enables the operator to ascertain visually the situation present in the printed product, without having to take a sample thereof. In this way the correctness of measurement will be tested, and in the event of trouble the immediate consequences are at once visible on the screen.

In the procedure of the invention, the register as well as density measuring marks can be identified in the image recorded with the camera and with their aid both the register and the density can be determined simultaneously. As a result, the apparatus applying the procedure will be simple. This arrangement affords the advantage, among others, that the register first measured from the camera image accurately ascertains the density measuring site, and therefore the density is measurable from exceedingly small measuring marks, or even from the register marks.

The image recording process and the image processing apparatus applying the procedure of the invention can be implemented using largely standard components and equipment. The apparatus and the software developing environment is therefore simple and advantageous, compared with equivalent methods of measurement in current use. Moreover, expansion of the apparatus is easy and favourable in price. The procedure of the invention may also be applied so that closed loop control is achieved in the control and implementation of printing.

The invention is described in detail in the following, referring to the attached drawings, wherein:

DESCRIPTION OF THE PREFERRED EMBODIMENTS

Figure 1:
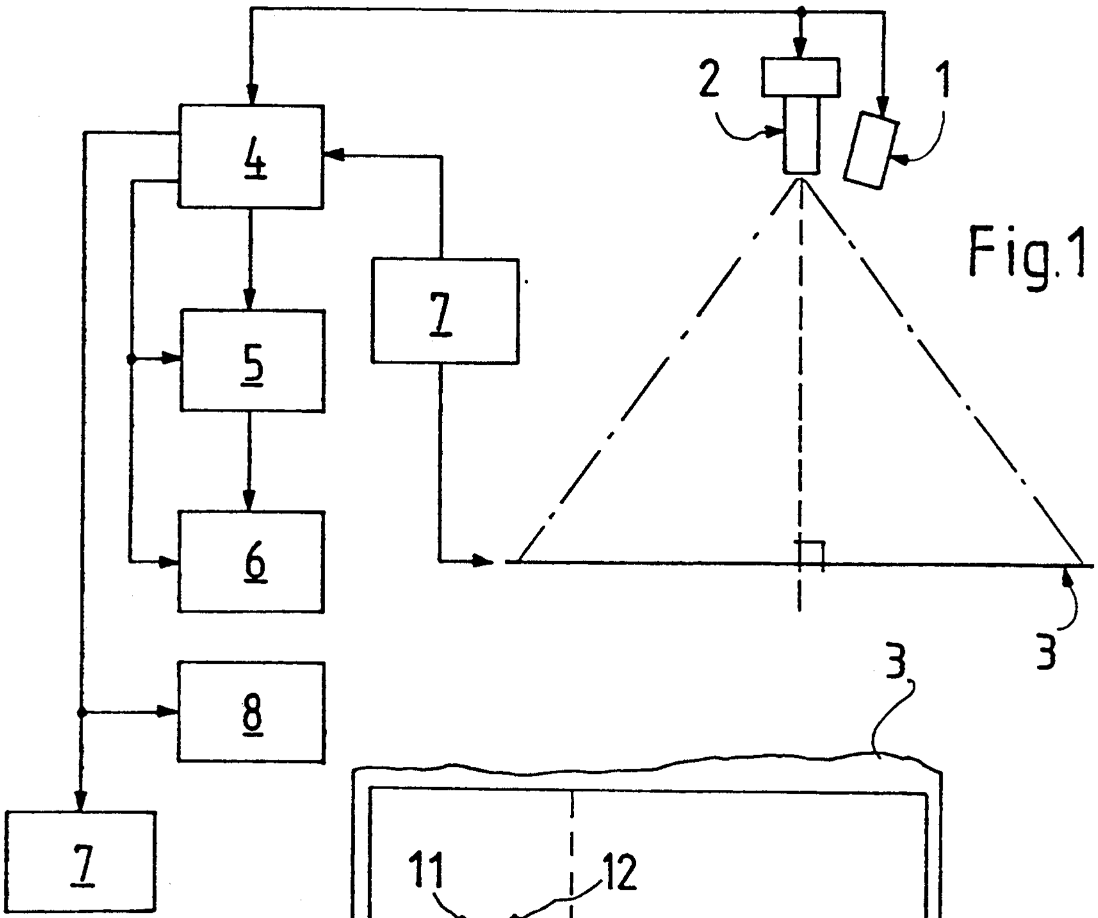
FIG. 1 presents a measuring apparatus applying the procedure of the invention, in the form of a principle diagram.

In FIG. 1, a lighting means 1 and an electronic camera 2 have been disposed above the printing base, such as a paper web 3. The lighting means 1 and the electronic camera 2 are suitably trained on the paper web 3. The electronic camera 2 is most advantageously disposed above the paper web 3 in such a way that it is perpendicular to the paper web. The camera 2 is, for instance, a CCD matrix camera or a semiconductor camera. The camera is connected to a suitable data processing unit 4, such as a microprocessor. Associated with the latter is an image memory 5, in which the images recorded by the camera are stored. The image memory 5 is also connected to a monitor 6 in this case. With the aid of the data processing unit 4 the operation both of the image memory 5 and of the monitor 6 is controlled. The operation of the light source 1 and of the electronic camera 2 is controlled with the aid of a suitable synchronizing unit 7. With the aid of the synchronizing unit 7, the whole system is synchronized with the speed of the paper web and with the repetition rate of the printings, i.e., of the areas printed thereon. The synchronizing unit 7 governs the operation of the data processing unit, or at least of the electronic camera and the light source. However, the light source 1 may also be arranged to operate continuously at those times when the measuring apparatus is in operation. The data processing unit 4 may be connected with a suitable recording unit 17 to record any faults that may occur and/or to an alarm unit 8. Through the alarm unit 8, alarm concerning abnormal events in connection with printing is obtained if required. The recording unit 17 as well as the alarm unit 8 may equally be implemented with software.

Figure 2:
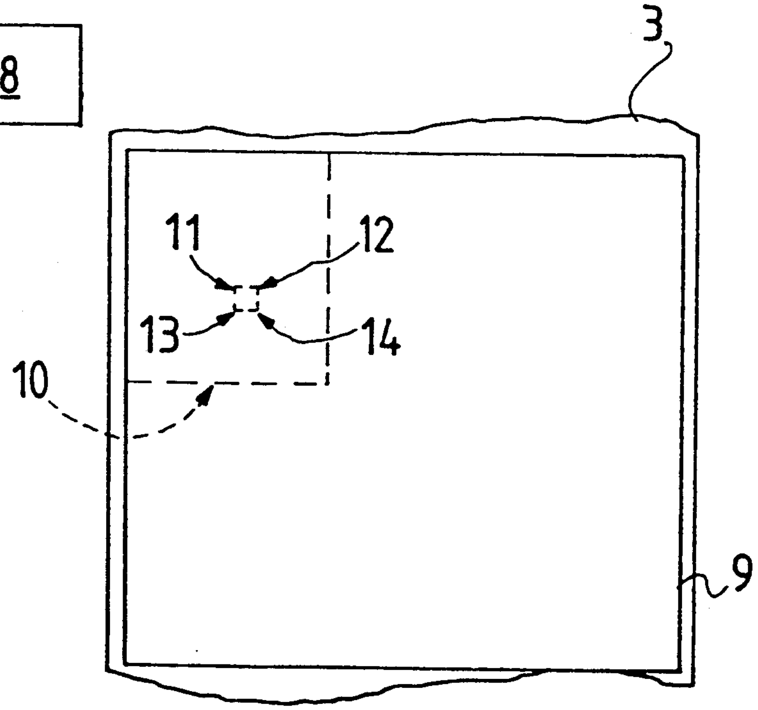
FIG. 2 shows, in top view, the paper web and the area on this paper web which the camera records.
Figure 3:
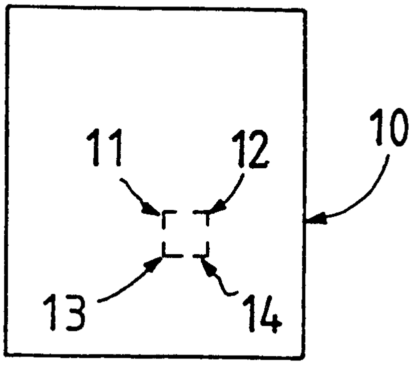
FIG. 3 shows, enlarged, part of the image of the paper web recorded by the camera.

FIG. 2 presents the paper web 3, seen from above, and the image area 9 which the camera records thereof. The size of the image area 8 can be regulated as need be. From the image area 9 a separate area 10 can be delimited around the measuring marks 11, 12, 13 and 14, as can be seen in FIG. 3. In the present case the measuring marks are register marks. They are identical in shape but placed in different positions, and they are meant for different colours. With the aid of a configuration-identifying programme provided in the data processing unit 4, the colours with which these register marks are associated are identified with the aid of the position of said register marks. Said register marks 11, 12, 13 and 14 are first used to measure the register, whereafter the proper location, relative to the register marks, of the possible density marks, equal in number and relating to different colours, is exactly known and measurement of the density of each colour can be made reliably from the image.

The apparatus applying the procedure of the invention, described in the foregoing, operates in principle as follows. The lighting means 1 and the electronic camera 2 have been trained on the paper web 3. The operation of camera 2 and lighting means 1 is synchronized with the printing transport speed with the aid of the synchronizing means 7 and, possibly, of the data processing unit 4. An arrested image is recorded from the measuring area 9 with the camera 2 and stored in the image memory 5 provided in connection with the data processing unit 4. With the aid of a suitable configuration-identifying programme, stored in the data processing unit 4, the measuring marks 11, 12, 13 and 14 are located within the image recording area 9. Subsequently, the image processing, or measurement, is confined to a small area 10 at the mark sites. The register marks relating to the different colours are identified with the aid of said configuration-identifying programme and a check for successful register is made for each colour. At the same time the density is determined from the image recorded with the camera 2, with the aid of the same measuring marks, after the register has been ascertained. The enlarged image area 10 can be visually observed all the time, with the monitor 6. If any deviation from normal printing quality is noted, alarm is actuated over the alarm unit 8 and requisite recordings are made with the unit 17.

In the foregoing, the invention has been described primarily as illustrated by one advantageous embodiment example thereof. The invention is however not meant to be confined exclusively to this embodiment: the procedure of the invention can be applied in multitudinous ways within the inventive idea presented in the claims following below.

We claim:

1. A method for controlling the quality of printing a printing image in an image area repetitively on a base web which is moved along a machine direction of associated printing machinery, comprising the steps of:

printing measuring marks, each mark having at least one of a predetermined shape and position adjacent the printing image in the image area;

providing a camera recording means trained on the base web for recording successive control images of the image area, including the measuring marks, being printed on the base web;

storing the camera-recorded control images in an image memory;

processing said control images stored in memory via a computer processing means, including identifying the measuring marks based upon at least one of their predetermined shape and position, and comparing the measuring marks as recorded to the expected at least one of their predetermined shape and position in order to determine any deviation therefrom, in order to thereby automatically control the printing machinery based upon any deviation determined by said computer processing means, wherein in the printing of marks step, each of said measuring marks has a predetermined position and density and corresponds to a respective color to be printed superimposed in color printing, and in the processing step, a deviation of any of said measuring marks in position is determined and used to control color registration of the printing machinery, and a deviation of any of said measuring marks in density is determined and used to control color density printed by the printing machinery, and wherein said camera recording means is a monochrome camera, and color registration and density of the printing machinery is controlled by the position and density of the measuring marks determined from monochrome images recorded by said camera recording means.

2. A method for controlling the quality of printing according to claim 1, wherein in the processing step, only a small area in the vicinity of the measuring marks is processed by said computer processing means.

3. A method for controlling the quality of printing according to claim 2, wherein the processing step includes magnifying said small processing area for display on a monitor.

4. A method for controlling the quality of printing according to claim 1, wherein in the printing of marks step, each of said measuring marks has a predetermined position and corresponds to a respective color to be printed superimposed in color printing, and in the processing step, a deviation of any of said measuring marks in position is determined and used to control color registration of the printing machinery.

5. A method for controlling the quality of printing according to claim 1, wherein in the printing of marks step, each of said measuring marks has a predetermined density and corresponds to a respective color to be printed superimposed in color printing, and in the processing step, a deviation of any of said measuring marks in density is determined and used to control color density printed by the printing machinery.

* * * * *